(12) United States Patent
Beale

(10) Patent No.: US 8,082,723 B2
(45) Date of Patent: Dec. 27, 2011

(54) DRAPING SYSTEM AND METHOD OF USE FOR THE TREATMENT OF HORSE HAIR

(76) Inventor: Rhonda Lorene Beale, Plano, TX (US)

( * ) Notice: Subject to any disclaimer, the term of this patent is extended or adjusted under 35 U.S.C. 154(b) by 327 days.

(21) Appl. No.: 12/220,646

(22) Filed: Jul. 25, 2008

(65) Prior Publication Data

US 2010/0018171 A1    Jan. 28, 2010

(51) Int. Cl.
*B68C 5/00*    (2006.01)

(52) U.S. Cl. ................. 54/79.2; 54/78; 54/79.1

(58) Field of Classification Search ............ 54/78, 79.1, 54/79.2, 79.3, 79.4; 119/850; 132/270
See application file for complete search history.

(56) References Cited

U.S. PATENT DOCUMENTS

| | | | | |
|---|---|---|---|---|
| 876,435 A * | 1/1908 | Caldwell | ...... | 54/79.2 |
| 2,131,495 A * | 9/1938 | Allen | ...... | 54/79.2 |
| 2,443,831 A * | 6/1948 | Miller | ...... | 54/79.1 |
| 5,361,563 A * | 11/1994 | Llamas | ...... | 54/79.2 |
| 5,694,750 A * | 12/1997 | Allen | ...... | 54/78 |
| 6,234,117 B1 * | 5/2001 | Spatt | ...... | 119/850 |
| 6,786,028 B1 * | 9/2004 | Longtin | ...... | 54/79.2 |

* cited by examiner

*Primary Examiner* — Rob Swiatek
(74) *Attorney, Agent, or Firm* — Jeffrey Roddy

(57) ABSTRACT

A draping system designed for the treatment of a horse tail or mane having drapes shaped to expose a horse tail and a horse mane, while protecting underlying and adjacent areas of the horse's coat from unwanted treatment solutions. The draping system is especially useful in cosmetic treatments of the horse tail or mane, as for example when applying coloring or permanent treatments or when applying a medicament in liquid or powder form.

14 Claims, 9 Drawing Sheets

DRAPING SYSTEM AND METHOD OF USE FOR THE TREATMENT OF HORSE HAIR

CROSS REFERENCE TO RELATED APPLICATIONS

None

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

The present invention relates generally to an apparatus and method of treating a horses tail and mane with specialized drapes and treatment solutions.

More specifically, it is often desirable to apply treatment solutions to the main and tail of a horse for cosmetic and other reasons. While braiding and tail extensions have long been known in the art, no ready solution has existed for the problem of coloring and or chemically treating horses' tail and mane. What is needed therefore is an easily used system for treating a horse tail and mane with treatment substances while protecting adjacent areas of the horse coat from inadvertent contact with the treatment substances.

BRIEF SUMMARY OF THE INVENTION

The present invention generally relates to a device and associated method for the treatment of a horse's tail and mane with treatment substances of both cosmetic and medical nature applied by isolating the horse tail or mane. Specifically, a system of drapes customized for equine use and a combination of treatment substances for application to a horse's body for cosmetic and other purposes are described.

Common to both preferred and alternate embodiments of the system described, are shaped drapes each designed to fit around the tail and mane portions of a horse, having apertures and slit shaped openings for the pulling through of either a horse tail or mane, with the remainder of each drape protecting adjacent and underlying areas from undesired contact with treatment substances. The drapes are kept on the animal by means of form fitting construction with ties, straps, snaps and hook and loop fasteners.

Both one and two-panel drapes have a joining means whereby an opening in the drape for the passing through of a horse tail or mane is held together and the drape positioned and secured upon a horse body preferably by paired straps encircling the body of the animal affixed at the distal ends, shorter straps having hook or loop fasteners at the respective distal ends, straps with hook fasteners paired with fastening pads with loop fasteners. Other securing means such as straps having a hook paired to an opposing grommet on the drape panel are conceivable and would be readily understood and appreciated by one skilled in the art. With the exception of one embodiment having a disposable plastic drape, the mane drapes described have a hook and eye fasteners just above the forelock by which the two panels are joined.

Preferably all drapes are constructed of a lightweight launderable material impermeable to treatment solutions such as so-called chemical capes which are usually a combination of polyurethane over a nylon substrate, although it is conceivable that the drapes may be made of thin plastic material such as high or low density polyethylene and therefore disposable. For one-time use drapes, plastic tie-straps would be made of the same material as the drape body to reduce costs. Additionally, the drapes whether reusable or disposable, can have an absorbent layer such as a foam backing to wick off excess liquid substance. Reusable drapes would be cut, sewn and assembled in the manner of garments with straps and fastening pads preferably sewn onto the panels. Disposable drapes would normally be die cut.

One object of the present invention is to provide a means for the treatment of a horse and specifically cosmetic beautification of a horse tail and mane.

Another object of the present invention is to provide a means of isolating a hair treatment to targeted areas while protecting adjacent areas.

A further object of the present invention is to provide a method of application of cosmetic solutions selected for use with a horse tail or mane.

The applicant is not aware of any previously described art having the features and advantages of the present invention.

Other objects and advantages of the present invention will become apparent from the following descriptions, taken in connection with the accompanying drawings, wherein by way of illustration and example, the various embodiments of the present invention are disclosed in the detailed description of the embodiments.

DETAILED DESCRIPTION OF THE INVENTION

Figure 1:
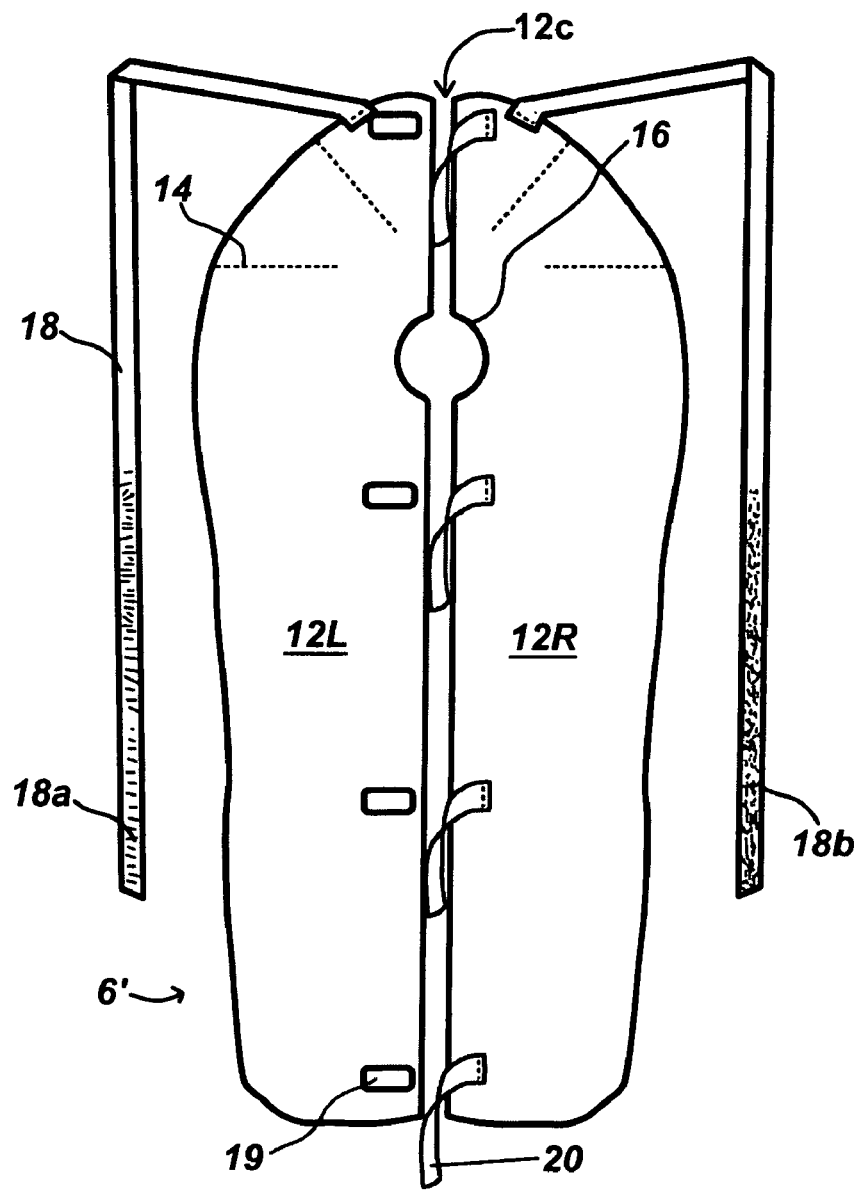
FIG. 1 is a plan view of a preferred embodiment having a two-piece rear drape.
Figure 2:
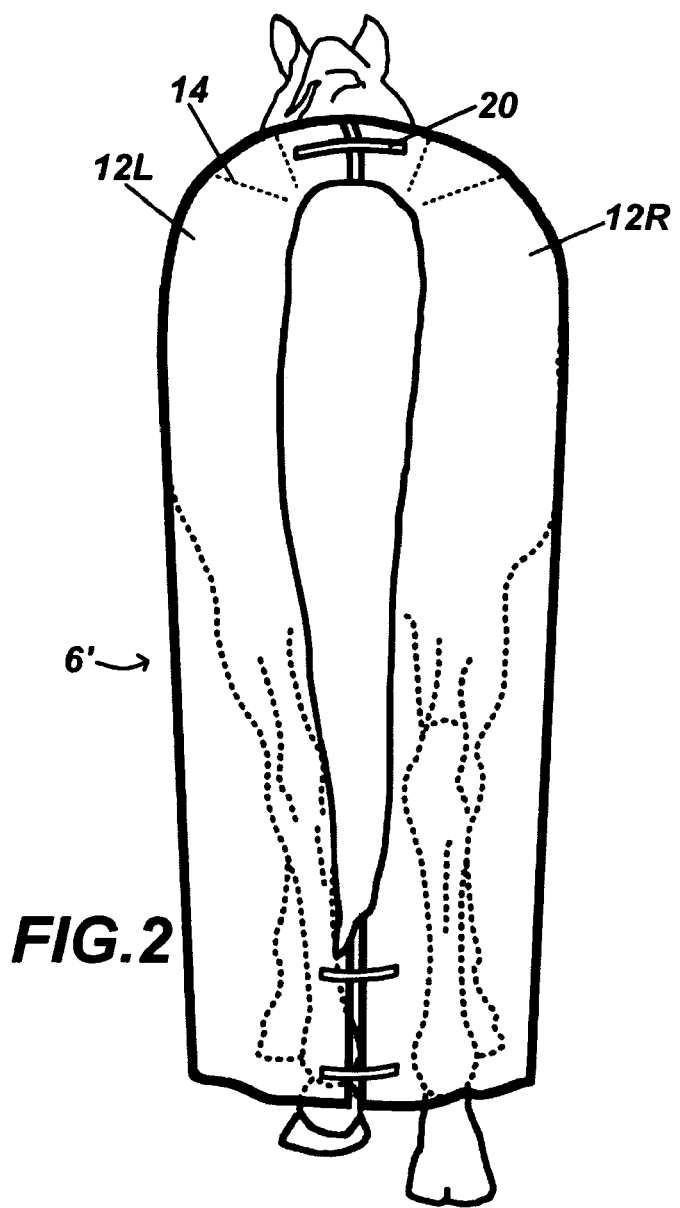
FIG. 2 is perspective view of a two-piece rear drape in typical use seen from behind the animal.

In FIG. 1, a plan view is shown of that part of the present invention providing for the selective exposure of the tail portion of a horse for the application of a hair treatment substance while offering draping protection to areas underlying the drape and adjacent to the tail. Rear drape 6' is divided into two panels 12L and 12R for the left and right sides of the horse respectively. Both left and right portions have an arcuate cut 16 so that a circular opening is formed for the passing through of a horse tail when the two panels are positioned upon the horse and held in place by strap pair 18 having a hook and loop fastening arrangement 18a,18b brought around the horse to encircle the animal's chest FIG. 5. Straps 20 disposed between the two panels are connectable to fastening pads 19 in order to hold the two panels together. The joining means of the straps 20 to fastening pads 19 may be a hook and loop fastening arrangement, although it is conceivable that straps 20 may be paired with adjacent opposing straps substituted for the fastening pads and then tied together, or metal hooks at the distal ends of the straps 20 may be paired with grommets sewn into the adjacent position of an opposite drape panel. As shown in FIGS. 1-2 and 6, a series of darts and pleats 14 create a curvature of the rear drapes 6', 8' suited to the form fitting of the rear quadrant of a horse covering the croup, hind quarters and buttocks of the animal. The two piece rear drape 6' is positioned by joining the two panels by fastening strap fastener 20 above the arcuate opening to the fastening pad 19 adjacent and placing the now conjoined panels forming a drape over the rear quadrant of the horse where the horses tail may be easily guided through the full length slit between the two panels; straps 18 are brought up and over the horse to encircle the animal's chest and the distal ends secured by using hook and loop fasteners or simply tying the ends together.

One alternate embodiment shown in FIG. 6 has a one-piece rear drape 8' with a single panel 13 having a slit terminating into a circular opening 17 for the passing through of a tail. One way of applying the one-piece rear drape 8' to the rear quadrant of a horse is to lift the horse tail over and into the slit and circular opening 17, fasten strap fastener 20 positioned above the slit to the fastening pad 19 adjacent and pull strap pair 18 up and over the horse's chest and securing the distal ends using hook and loop fasteners or simply by tying the ends together. The portion of slit 12c inferior to the horse tail is secured from flapping by fastening the multiple strap fasteners 20 to the opposing fastening pads 19 along the length of the slit.

Referring to FIGS. 3, 4, 7-9; mane drapes 7', 9', 10' may be positioned upon the horse by first placing connecting the two panels with the hook and eye fasteners on that portion of the panels over the forelock while passing the ears through the ear apertures, or in the case of mane drape 11', using the opposing ties on that portion of the panels over the forelock. Standing to one side of the animal, first one panel edge is brought adjacent to the horse mane and then the opposing panel so that the mane protrudes from the opening between the panels. The panels are joined by fastening straps at the terminus of the mane at the base of the neck and in front of the neck.

Figure 3:
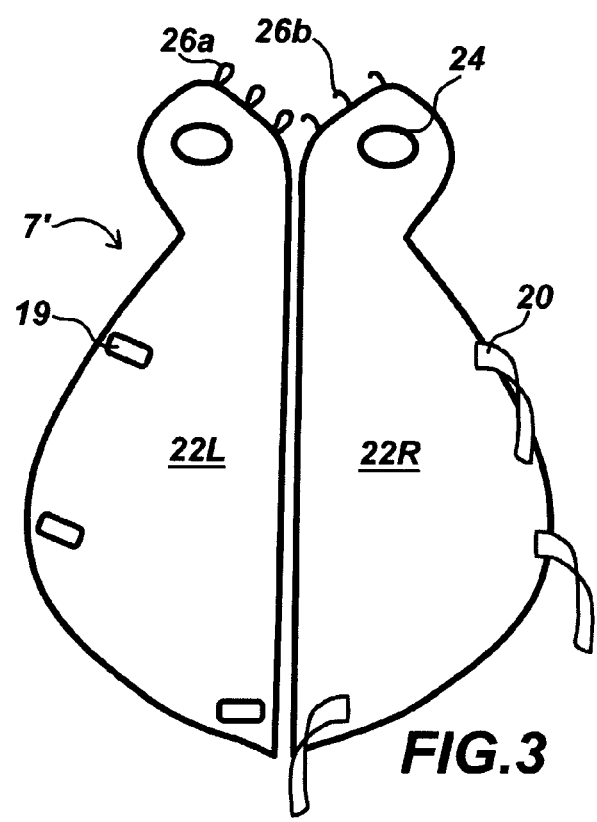
FIG. 3 is plan view of a preferred embodiment having a mane drape.

FIG. 3 is a plan view showing a preferred embodiment having a mane drape 7' in two parts 22L, 22R that when brought together, form a slit-shaped longitudinal opening for the passing through of a mane so that the mane is selectively exposed. Openings 24a are for the passing through of the ears. A series of paired eye-hooks 26b and loops 26a are provide for the joining of that portion of the drape residing atop the forelock. While eye-hooks and loops are the preferred means of joining the two portions, it is conceivable that opposite ties and straps with Velcro® type fasteners can be the means for joining.

Figure 4:
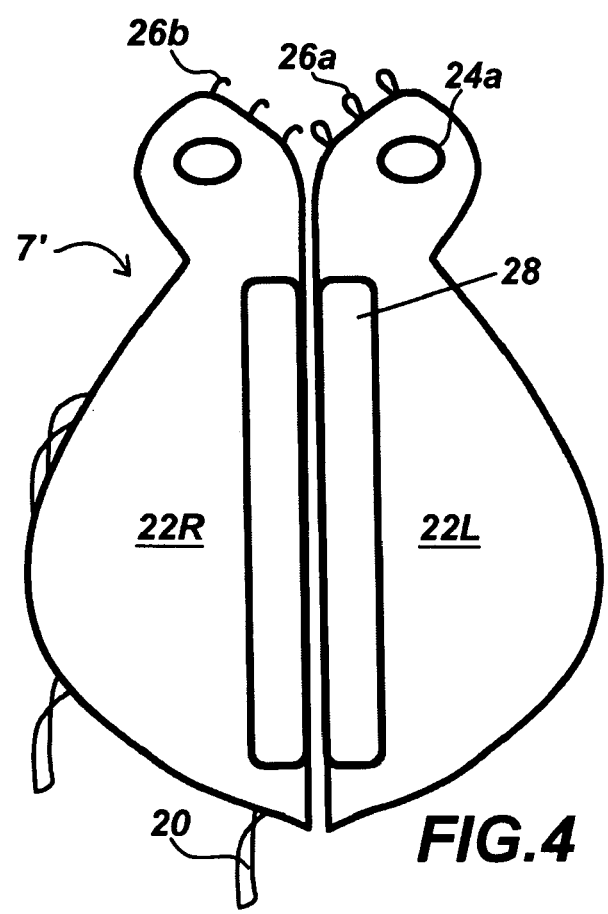
FIG. 4 is the obverse of FIG. 3.

FIG. 4 shows the underside of FIG. 3 showing two absorbent pads 28 attached lengthwise along the underside edge forming the slit-shaped longitudinal opening that are in communication with the base of the horse mane for the absorption of excess liquid substance. While preferably, the absorbent pads are thin; less than one-half inch so as not the raise the panels off of the area adjacent to the mane, are made of foam and are sewn or glued onto the underside of the drape as shown, it is conceivable that the draping panels may be entirely multi-layered; a top layer being a chemically resistant fabric such as the chemical resistant smocks used in hair care salons, and a bottom layer of absorbent material such as polyurethane foam. In either case, excess liquid substance is wicked from the base of a horse's mane or tail isolating the adjacent coat from unwanted treatment substance.

Figure 5:
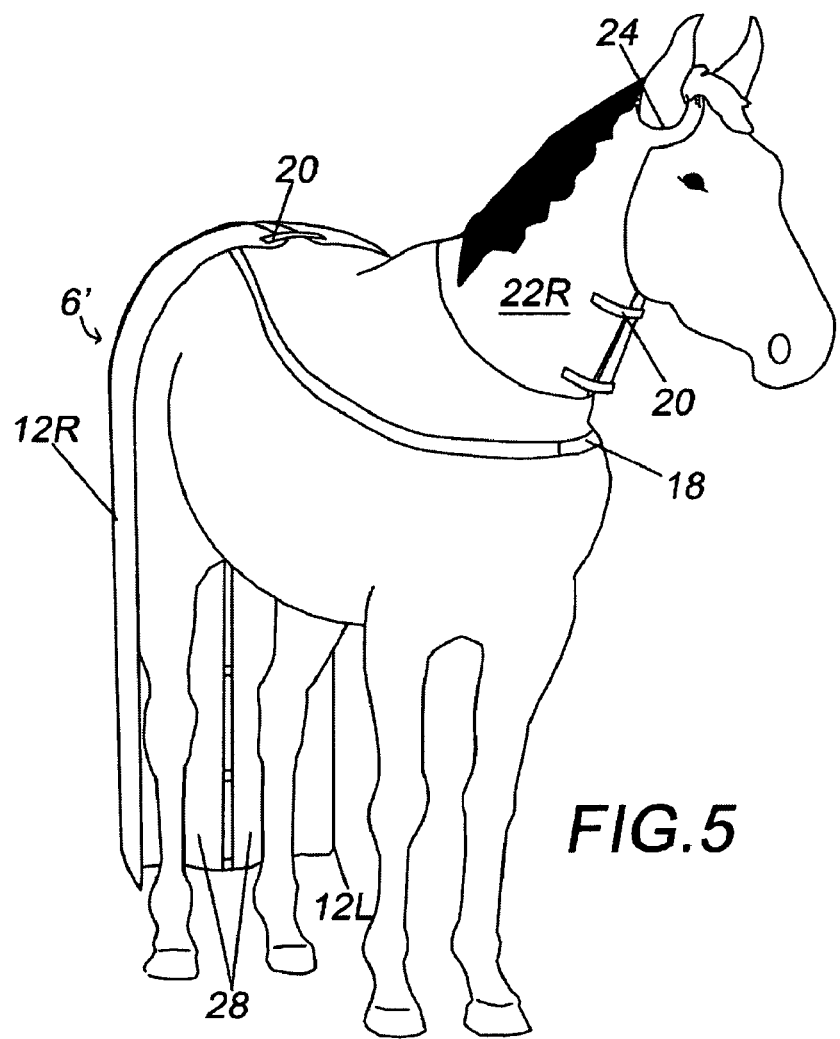
FIG. 5 is a perspective view of both a rear drape and mane drape in place on a horse.
Figure 6:
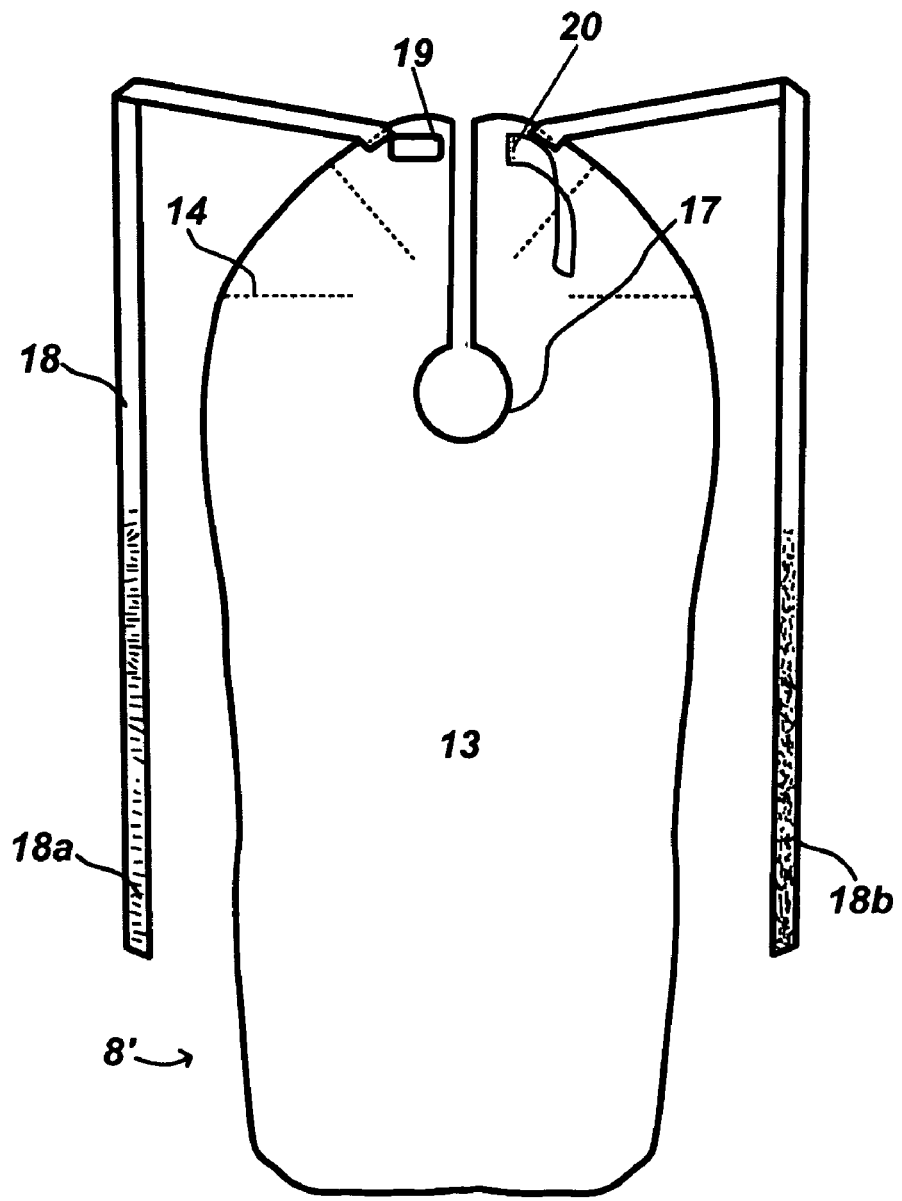
FIG. 6 is a plan view of an alternate embodiment having a one-piece rear drape.

FIG. 5 shows the system of drapes in position on a horse in what would be a typical use showing the strap pair 18 being attached to one another encircling the horse's chest. Shown also are the hook and loop strap fasteners 20 to fastening pads 19 for securing the two piece mane drape about the horse's neck and the ear openings 24a for the passing through of the ears.

Figure 7:
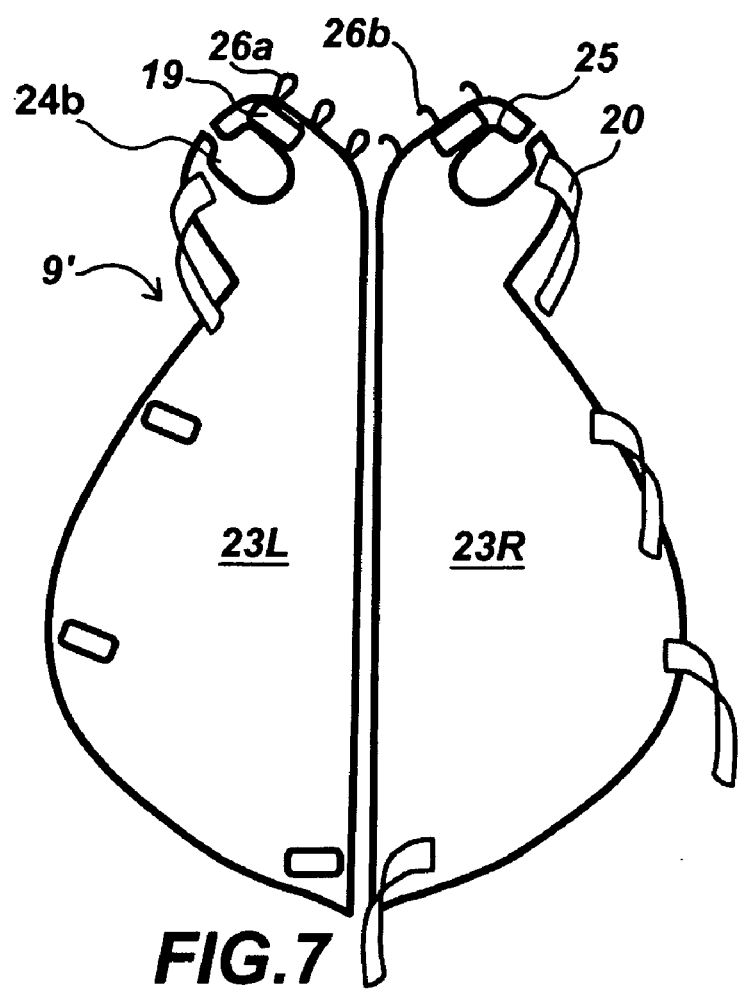
FIG. 7 is plan view of an alternate embodiment having a mane drape with arcuate openings for the ears.

FIG. 7 shows an alternate embodiment having a mane drape 9' in two parts 23L, 23R with arcuate openings 24b to accommodate a horse's ears, the arcuate opening 25 being closed by straps with hook and loop fasteners 19, 20. A series of paired eye-hooks 26b and loops 26a are provide for the joining of that portion of the drape residing atop the forelock.

Figure 8:
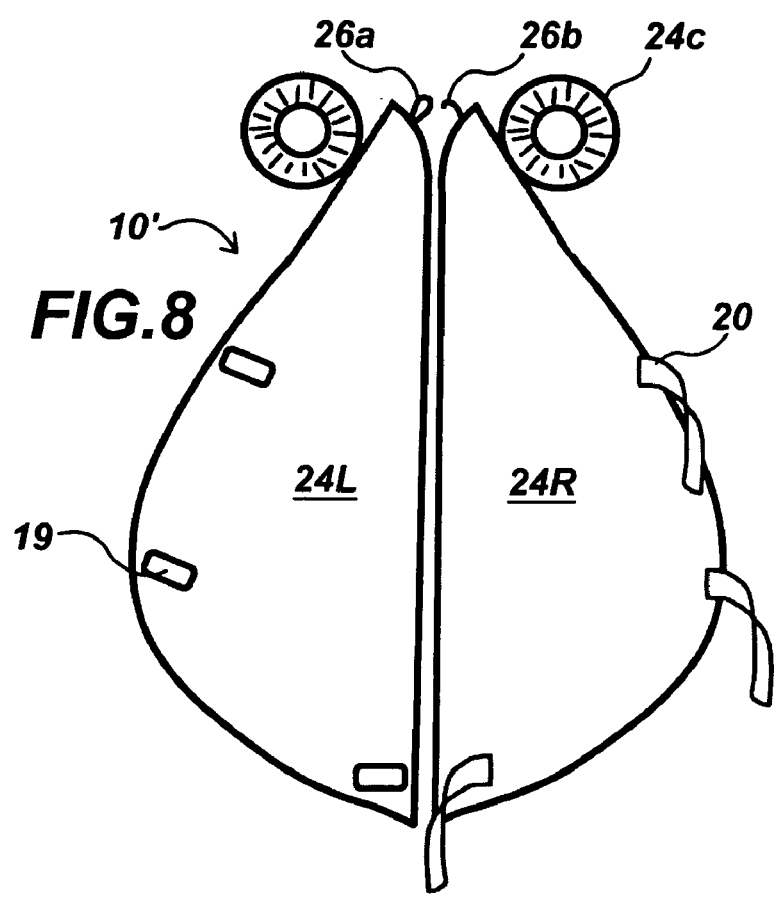
FIG. 8 is plan view of another alternate embodiment having a mane drape with annular elastic bordered openings for the ears.

FIG. 8 shows yet another alternate embodiment having a mane drape 10' in two parts 24L, 24R with annular ear openings with an elastic gathered periphery 24c. A series of paired eye-hooks 26b and loops 26a are provide for the joining of that portion of the drape residing atop the forelock.

Figure 9:
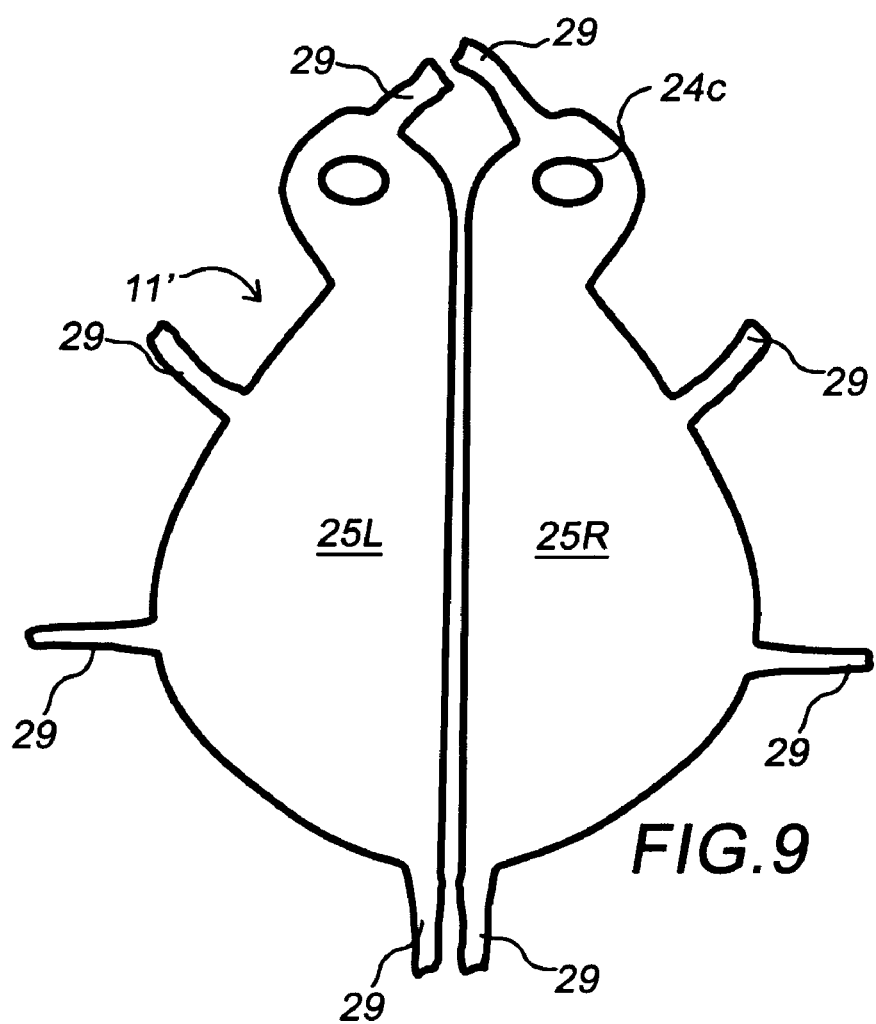
FIG. 9 is plan view of yet another alternate embodiment having a mane drape that is disposable, being made of sheet plastic with ties about the perimeter.

FIG. 9 shows a yet another embodiment having a mane drape 11' in two parts 25L, 25R being constructed of die cut disposable sheet plastic with self straps 29.

The following is given as a non-limiting example illustrating a preferred manner of use of the present invention in the application of a cosmetic (coloring) treatment to a horse tail and mane:

Example 1

1) apply and secure the specific drape to the mane and tail areas of a horse exposing those areas requiring treatment;
2) mix colorant with a volume of peroxide following colorant manufacturer directions;
3) apply colorant with coloring brush;
4) after applying colorant evenly, use a grooming comb to distribute color throughout the hair;
5) leave colorant to set following times recommended by colorant manufacturer;
6) rinse hair with water followed by shampoo;
7) apply conditioner and rinse with water;
8) remove drape from the mane and tail areas of the horse.

The following is given as a non-limiting example illustrating a preferred manner of use of the present invention in the application of a powdered medicament to a horse tail and mane:

Example 2

1) apply and secure the specific drape to the mane and tail areas of a horse exposing those areas requiring treatment;
2) apply powdered medicament to exposed tail and mane;
3) allow the medicament to set following times recommended by manufacturer;
4) remove drape from the mane and tail areas of the horse.

The following is given as a non-limiting example illustrating a preferred manner of use of the present invention in the application of a liquid medicament to a horse tail and mane:

Example 3

1) apply and secure the specific drape to the mane and tail areas of a horse exposing those areas requiring treatment;

2) apply liquid medicament to exposed tail and mane with a grooming comb to distribute evenly throughout the hair;
3) allow the medicament to set following times recommended by manufacturer;
4) remove drape from the mane and tail areas of the horse.

The aforementioned description and examples given are not intended to limit the scope of the invention to the particular embodiments set forth, but on the contrary, it is intended to cover such alternatives, modifications, combinations and equivalents as may be included within the spirit and scope of the invention as defined by the appended claims.

I claim:

1. A draping system for the treatment of equine hair comprising
    a first drape having a body shaped for the selective exposure of a first treatment area and containment thereon of liquid solutions and powdered solutions; and,
    a second drape having a body shaped for the selective exposure of a second treatment area and containment thereon of liquid solutions and powdered solutions, and having a pair of edges, each edge having a arcuate cutout, and the cutouts in the edges forming a circular aperture about the base of an equine tail when the edges are brought into a position opposite one another.

2. The draping system of claim 1, in which said first drape exposes an equine mane and protects underlying and adjacent areas of the body of said equine and said second drape exposes an equine tail and protects underlying and adjacent areas of the body of said equine.

3. The draping system of claim 1, in which said first drape having a body further comprising a pair of draping panels that are removably affixed to one another along an adjacent edge.

4. The draping system of claim 1, in which said second drape having a body further comprising a pair of draping panels that are removably affixed to one another along an adjacent edge.

5. The draping system of claim 1, further comprising a plurality of treatment solutions for the treatment of selected areas of a horse, said treatment solutions selected from at least one of the following: shampoo, medicament, conditioner, hair colorant, hair dye, pest repellent.

6. The draping system of claim 1 in which said first drape and second drape are adjacent those portions of the horse intended for treatment while exposing said portions of the horse intended for treatment, said first drape and second drape each having two panels held together by a fastening means selected from at least one of the following: straps, hook and loop fasteners, eye-hook and loop, ties, hooks and grommets.

7. The draping system of claim 1 in which said first drape and second drape each have a chemically resistant top layer joined to an absorbent bottom layer.

8. A pair of drapes assistive in the treatment of a horse tail and a horse mane comprising:
    a first drape having a body forming an opening for the exposure of a horse tail, the opening produced when edges of the first drape possessing an arcuate cutout, are brought together in mirrored opposition and the body covers areas circumjacent said tail for the treatment of the tail hair and protection of said adjacent areas from treatment substance; and,
    a second drape having a body forming an opening for the exposure of a horse mane and covering of areas adjacent said mane for the treatment of the mane hair and protection of said adjacent areas from treatment substance.

9. The pair of drapes in claim 8 in which said treatment substance is taken from at least one of the following: shampoo, medicament, conditioner, hair colorant, hair dye, pest repellent.

10. The pair of drapes in claim 8 in which said body of first drape is of one-piece construction.

11. A method for the treatment of a horse tail and mane comprising:
    i) fitting and attaching a drape having a pair of edges, each edge with a arcuate cutout shaped to encircle a base of a horse tail when the edges are placed opposite one another circumjacent to said base in order to expose said tail, while protecting adjacent areas of the horse from undesired treatment substance; and,
    ii) fitting and attaching a drape shaped to abut the base of a horse mane exposing said mane, while protecting adjacent areas of the horse from undesired treatment substance; and,
    iii) applying a treatment substance to said tail and mane.

12. The method for the treatment of a horse tail and mane of claim 11 further comprising a treatment substance taken from at least one of the following: shampoo, medicament, conditioner, hair colorant, hair dye, pest repellent.

13. A draping system for the treatment of an equine mane and tail comprising:
    a set of drapes including,
        (i) a first drape selectively exposing an equine mane; and,
        (ii) a second drape selectively exposing an equine tail; and,
    the system in which the first and second drapes each include matching chemically resistant draping panels that are removably affixed together another along adjacent edges, and in which portions of the adjacent edges of the first drape combine to encircle a base of an equine mane, and portions of the adjacent edges of the second drape have arcuate shaped cutouts that when fastened together combine to encircle a base of an equine tail when the edges are placed opposite one another.

14. The draping system of claim 13 further comprising a plurality of treatment solutions for the treatment of selected areas of a horse, said treatment solutions selected from at least one of the following: shampoo, medicament, conditioner, hair colorant, hair dye, pest repellent.

* * * * *